United States Patent [19]

Sakalian

[11] Patent Number: 5,121,392
[45] Date of Patent: Jun. 9, 1992

[54] SYNCHRONOUS TO NON-SYNCHRONOUS DATA LINE PAIR INTERFACE APPARATUS

[75] Inventor: Steve Y. Sakalian, Garland, Tex.

[73] Assignee: Alcatel Network Systems, Inc., Richardson, Tex.

[21] Appl. No.: 483,168

[22] Filed: Feb. 21, 1990

[51] Int. Cl.⁵ .................................. H04J 3/06
[52] U.S. Cl. .................... 370/100.1; 370/48; 370/91; 375/118
[58] Field of Search .................. 370/47, 48, 49, 84, 370/100.1, 95.1, 95.2, 95.3, 91, 92, 93, 94.1, 94.2, 112; 375/117, 118

[56] References Cited

U.S. PATENT DOCUMENTS

| | | | |
|---|---|---|---|
| 3,809,820 | 5/1974 | Sullivan | 370/100.1 |
| 4,068,098 | 1/1978 | Thyselivs | 370/84 |
| 4,665,518 | 5/1987 | Champlin et al. | 370/100.1 |
| 4,941,141 | 7/1990 | Hayano | 370/100.1 |

Primary Examiner—Douglas W. Olms
Assistant Examiner—Shick Hom
Attorney, Agent, or Firm—Bruce C. Lutz; Dennis O. Kraft

[57] ABSTRACT

An algorithm is presented along with circuitry for implementing same to accomplish the interface of a pair of synchronized data lines with a pair of non-synchronized data lines using data buffers where there can be as few as three cells of data buffers to accomplish reading data out and writing data in without interfering one with the other. This algorithm is accomplished by measuring the time skew between overhead bits of the two non-synchronized data streams and writing to the frame most recently read by the synchronized data stream based on an algorithm formulated in view of or based on a function of the time skew.

4 Claims, 4 Drawing Sheets

ONE=B(C⊕D)+A C D+Ā B̄ C̄ D̄
TWO=A(C⊕D)+B C̄ D̄+Ā B̄ C D

FIG. 3
| | A B C D | ONE | TWO | THREE |
|---|---|---|---|---|
| 0 | 0 0 0 0 | 1 | | |
| 1 | 0 0 0 1 | | | 1 |
| 2 | 0 0 1 0 | | | 1 |
| 3 | 0 0 1 1 | | 1 | |
| 4 | 0 1 0 0 | | 1 | |
| 5 | 0 1 0 1 | 1 | | |
| 6 | 0 1 1 0 | 1 | | |
| 7 | 0 1 1 1 | | | 1 |
| 8 | 1 0 0 0 | | | 1 |
| 9 | 1 0 0 1 | | 1 | |
| 10 | 1 0 1 0 | | 1 | |
| 11 | 1 0 1 1 | 1 | | |
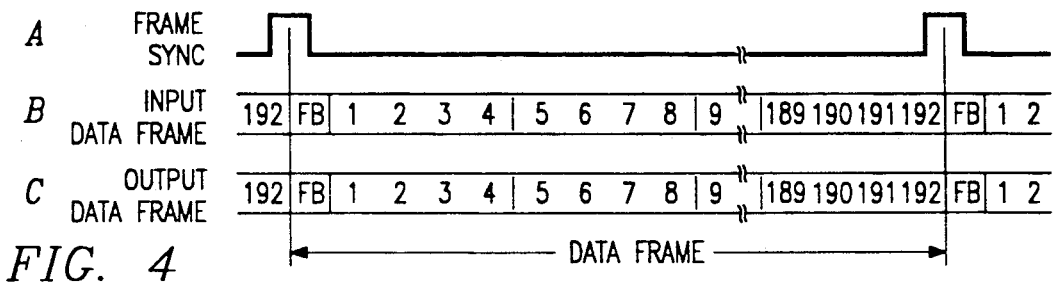
FIG. 4
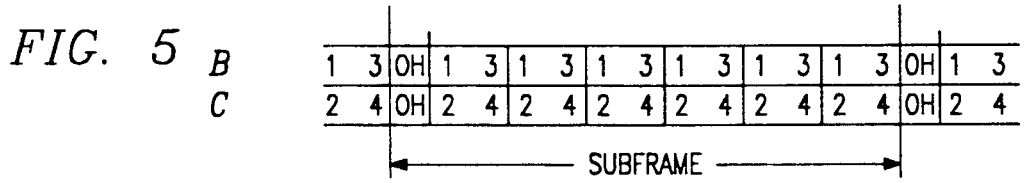
FIG. 5
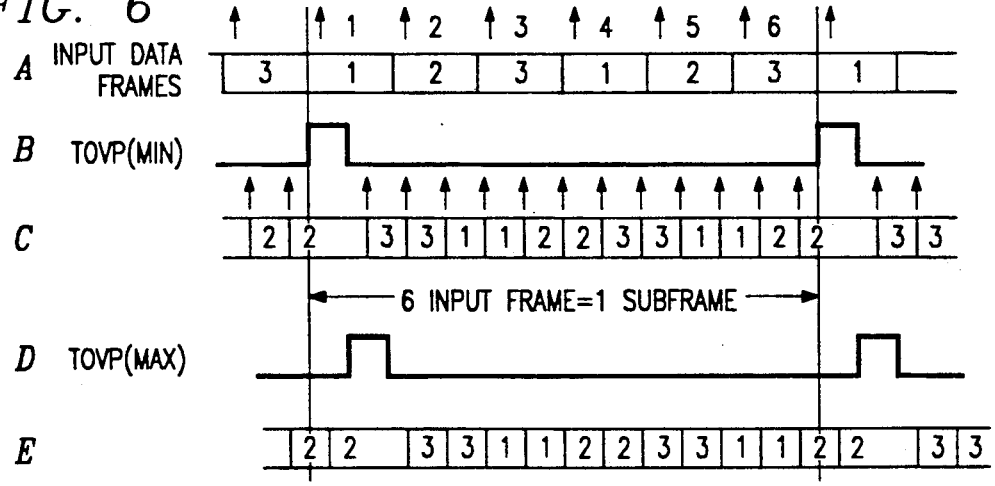
FIG. 6

SYNCHRONOUS TO NON-SYNCHRONOUS DATA LINE PAIR INTERFACE APPARATUS

THE INVENTION

The present invention is generally concerned with electronics and more specifically concerned with interfacing between a high frequency synchronized pair of input/output data lines and a pair of lower frequency non-synchronized input/output data lines. Even more specifically, the present invention is concerned with accomplishing this interfacing using no more than three segments of elastic buffer and without there being any interference between the reading and writing functions in a given buffer.

BACKGROUND

To the best of the present applicant's knowledge, there is no prior art in this area. However the applicant believes that a probable prior art solution probably exists in the form of a large enough buffer on the non-synchronous receive data side of the interface to accommodate at least an entire frame of received data information.

The present invention, in one embodiment, utilized information in a low frequency data frame which contained information equivalent to that in six different frames of a synchronized data source. Through an analysis of the timing involved, I was able to use three cells in the data buffer for each line of the pair whereby the synchronized pair are utilizing the same access sequence to the respective read and write data buffers while the non-synchronized pair used a standard algorithm for the transmit side to read from the data buffer in a non-interfering matter and used the time skew between framing bits of the transmit and receive section of the non-synchronized pair to ascertain the appropriate cell for writing the first data occurring after the framing bit of the received data to prevent interference with the reading of that data as the synchronized pair.

It is thus an object of the present invention to minimize the data buffer size requirements in an interface between a synchronized pair of data transmission means and a non-synchronized pair of data transmission means.

Other objects and advantages will be apparent from a reading of the specification and appended claims in conjunction with the drawings wherein:

FIG. 3 is a table illustrating the operation of an algorithm presented in FIG. 1 for understanding the logic within a logic detection block of FIG. 2;

FIG. 4 is a set of waveforms showing the input and output data frames of the synchronized data and is used in explaining FIGS. 1 and 2;

Figure 1:
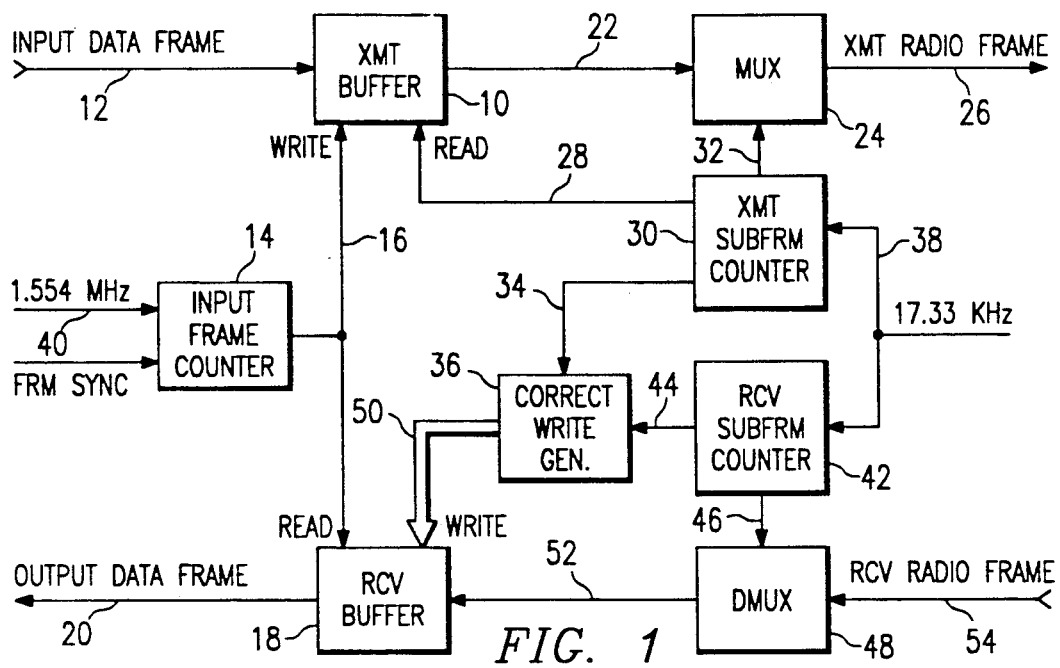
FIG. 1 is a block diagram of the present inventive concept.
Figure 2:
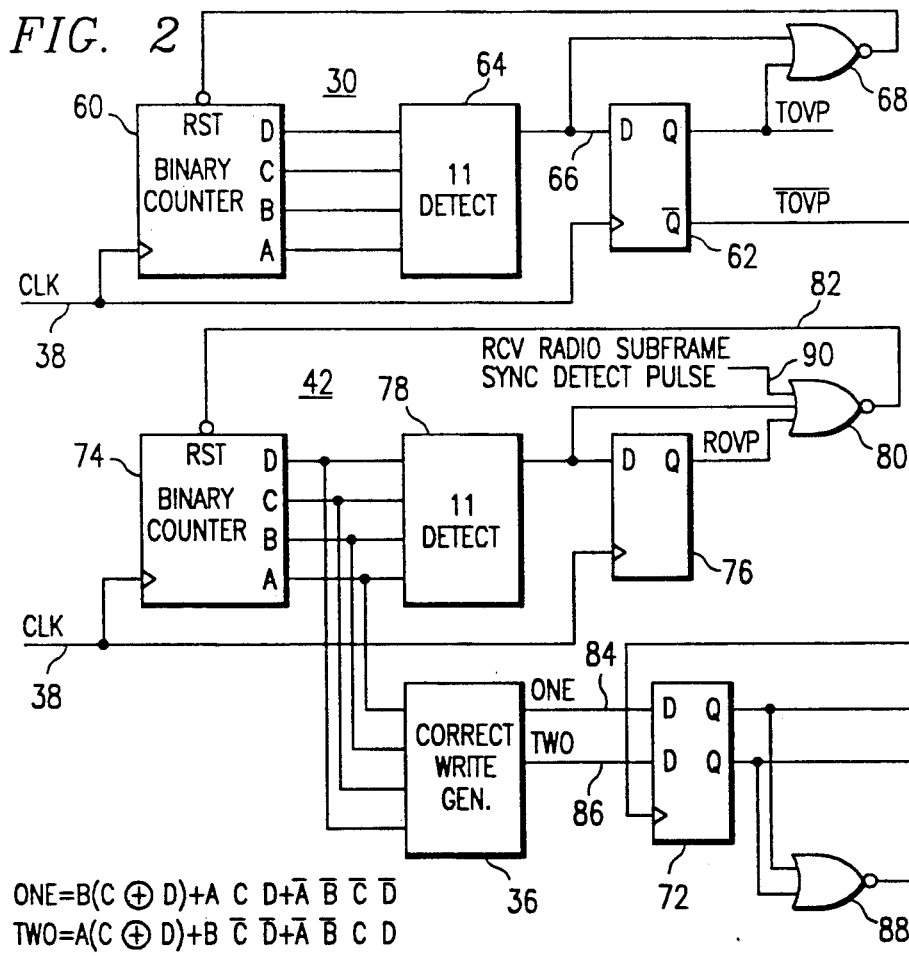
FIG. 2 is a block schematic diagram the transmit subframe counter, the receive subframe counter, and the correct write generator of FIG. 1.
Figure 7:
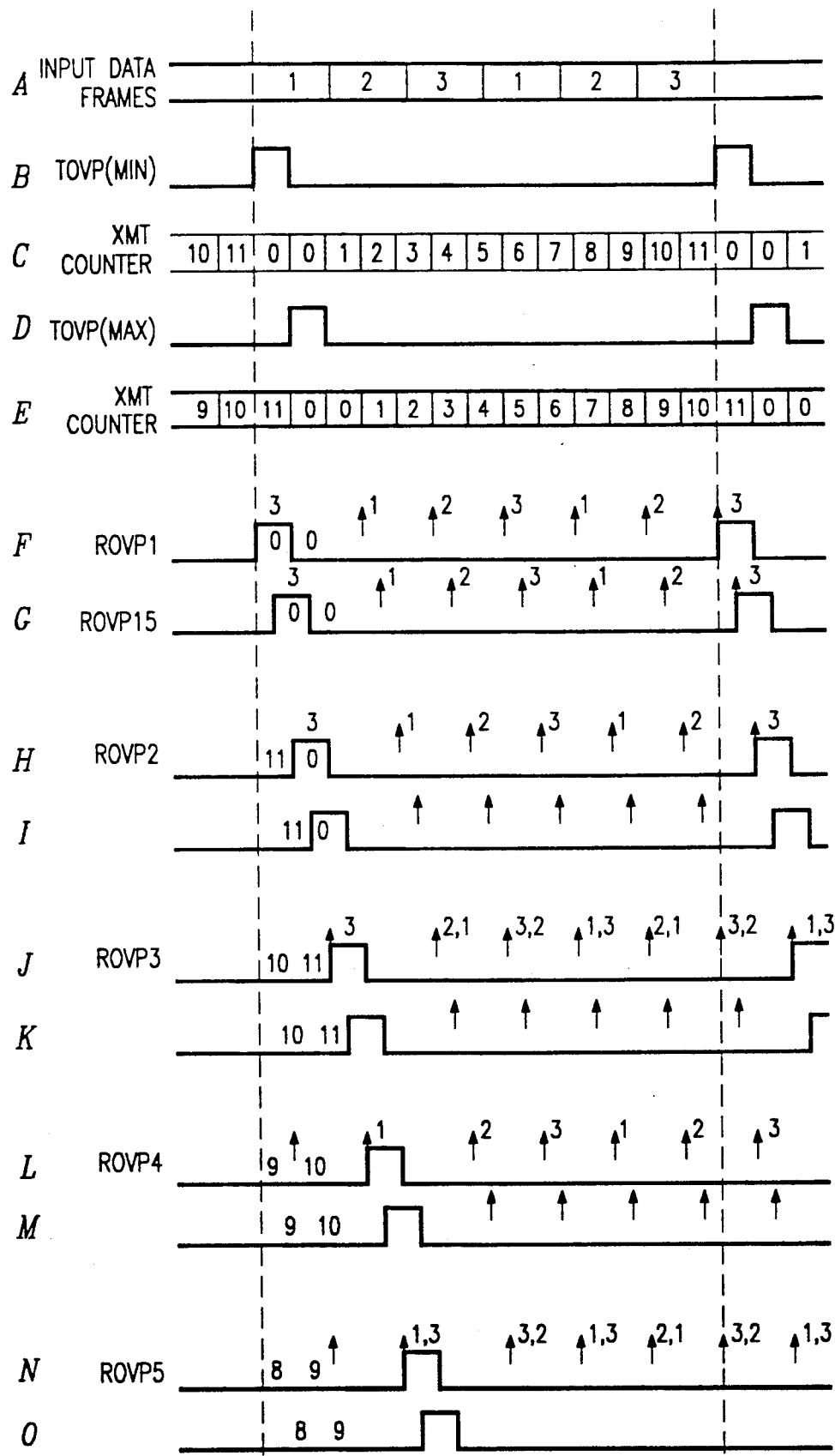
Figure 8:
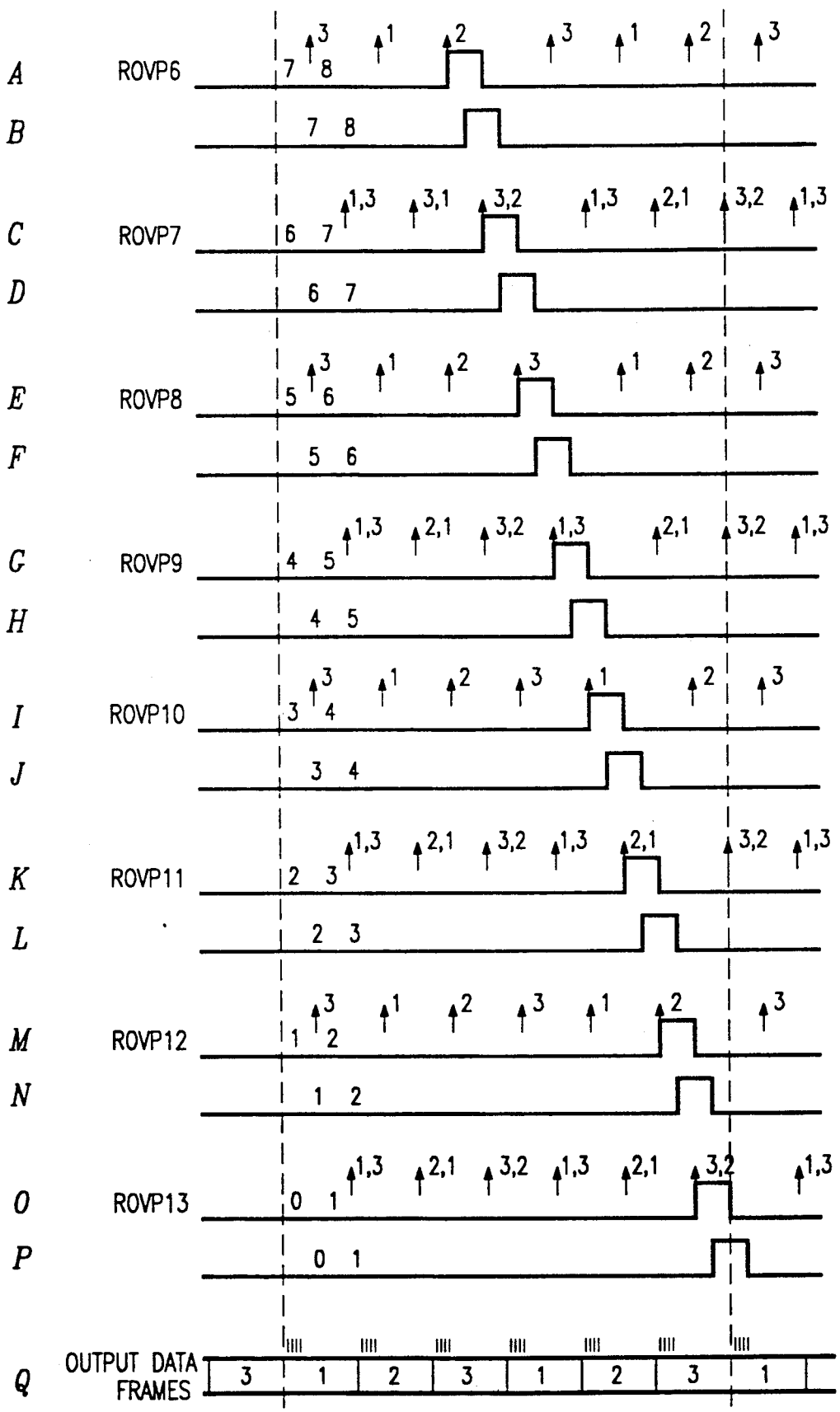

FIG. 5 comprises a set of waveforms showing the composition of the transmit portion of the non-synchronized data channel;

FIG. 6 is a set of waveforms used to expand the information presented in FIG. 5 and is used in explaining the operation of FIGS. 1 and 2; and FIGS. 7 and 8 are further sets of waveforms used in explaining the relationship of the received non-synchronous data transmission channel relative the transmitted channel and the significance of that in designing the circuits of FIGS. 1 and 2.

DETAILED DESCRIPTION

In FIG. 1 a transmit data buffer 10 receives synchronized data on an input data frame line 12. An input frame counter 14 provides write signals on a lead 16 to data buffer 10 and provides read signals to a receive data buffer 18. Data buffer 18 has an output frame lead 20 which provides a data which is in sychronism with the input lead 12. Thus, the data frames on leads 12 and 20 comprise a synchronized pair of data frames. An output from data buffer 10 is supplied on a lead 22 to a multiplexer block 24 which provides output signals on lead 26 further labeled as transmit (XMT) radio frame. The data buffer 10 receives read inputs on a lead 28 from a transmit subframe counter 30. Subframe counter 30 also provides timing signals on a lead 32 to multiplexer 24 and provides an indication of the time of occurrence of a framing pulse on a lead 34 to a correct write generator 36. The transmit subframe counter 30 receives clock signals on a lead 38 which are further labeled as being 17.33 kilohertz. Thus the frequency of the transmit radio frame is relatively low as compared to the synchronized incoming data which is clocked at 1.554 MHz illustrated by a lead 40 coming into the input frame counter 14. The lead 38 is also supplied to a receive subframe counter block 42. Counter block 42 supplies signals on a lead 44 to the correct write generator 36 and also provides timing signals on a lead 46 to a demultiplexer 48. The receive data buffer 18 receives write signals on a set of leads 50 from block 36 and receives non-synchronous incoming data on a lead 52 from the demultiplexer 48. The supply of signals to demultiplexer 48 is on a lead 54 and is further labeled RCV radio frame.

In FIG. 2 the same numbers as used in FIG. 1 are used where appropriate. The 17.33 kHz clock signal is supplied on lead 38 to the first binary counter 60 and to a D flip-flop 62 comprising a part of the transmit subframe counter 30. The outputs of the counter 60 are supplied to an 11 count detector 64 which provides an output on a lead 66 to D flip-flop 62 whenever a count of 11 is detected. The lead 66 is also supplied to a NOR gate 68 which receives an additional output from the Q output of D flip-flop 62. The output of NOR gate 68 is supplied to a reset input of the counter 60 to recommence counting. The Q-bar output of D flip-flop 62 is supplied on the lead 70 to a clock input of a part of flip-flops 72. The clock input 38 is also supplied to a second binary counter 74 and to a further D flip-flop 76 comprising a part of the receive subframe counter 42. In a manner similar to that of the transmit subframe counter 30, the receive subframe counter contains an 11 count detector 78 which supplies outputs to the D flip-flop 76 and to a NOR gate 80 receiving its second input from the Q output of D flip-flop 76. An output of NOR gate 80 is supplied on a lead 82 to the reset input of counter 74. The count output of counter 74 is also supplied to the correct write generator 36 which has output leads 84 and 86 providing outputs labeled ONE and TWO, respectively. The count algorithm used to design the logic circuits within 36 to provide the "1" output are shown in the lower portion of FIG. 2 where a logic "1" is provided on output ONE when there is a B output and exclusively a C or a D, or an A, a C and a D, or not A and not B and not C and not D. This can be confirmed from the table of FIG. 3. A similar approach is used to ascertain the logic design for having an output TWO on line 86. The two write enable (WE) outputs of block 72 are supplied to a NOR gate 88 which provides an output if there is a logic "0" for both inputs indicating that neither leads 84 or 86 contain a logic "1". Thus, the two outputs of the D flip-flops 72 and the NOR gate 88 comprise the set of leads 50 supplying signals to the receive buffer 18 as to which cell should be initially written into. Receive ratio subframe sync detect pulse is supplied on a lead 90 as a third input to the NOR gate 80, which provides an initation such that the counter 74 is counting from the time of the received framing pulse. The circuit of FIG. 2 is free running until a connection is established by receiving and detecting RCV radio frame. Thus, there is a signal only occasionally on lead 90 and normally the signals for NOR gate 80 are the other two input leads from the input and output side of the D flip-flop 76.

The table of FIG. 3 illustrates the decoding of the four input leads A through D to correct write generator 36. As illustrated, there is a "1" output when at the time of the framing pulse for the transmit frame there is a count of 0, 5, 6 or 11. There is a signal on lead 86 indicating a TWO decode whenever the count on counter 74 is 3, 4, 9 or 10 at the time of the transmit framing pulse and the remaining times there is nothing on either lead 84 or 86 and thus there is a logic "1" output from NOR gate 88.

The waveform A in FIG. 4 illustrates the periodic occurrence of a frame sync while waveform B illustrates the input data frame comprising 192 data bits and a framing bit. Waveform C of FIG. 4 illustrates the output data frame which is synchronized with the input data frame.

In FIG. 5 the output signal appearing on lead 26 of FIG. 1 is illustrated along with waveform A showing the transmit overhead pulse where the transmit overhead pulse coincides with the overhead pulse position of waveforms B and C. Within the output data stream, the data bits of waveforms B and C are combined as discussed later where bits 1 and 2 of FIG. 4B are combined to produce a single symbol. Thus, the four bits retrieved from the FIG. 4B input data frame are combined into two data bit positions of the subframes of FIGS. 5B and 5C. A subframe of the transmit data frame thus includes data from six frames of the input data frame of FIG. 4B plus the overhead bit.

Reference is now made to FIG. 6 where the six incoming data frames are shown in waveform A as being inserted in different cells of the data buffer such as 10 of FIG. 1. In other words, starting with a given input data frame, the four data bits are inserted in the first cell of the data buffer 10 and the next input data frame has four bits inserted in the next cell. The data bits of the following frame are inserted in the third cell and the data bits of the next frame are inserted back in cell 1. Waveform B of FIG. 6 shows again the transmit overhead pulse as illustrated in FIG. 5A. The waveform of FIG. 6C shows the reading from data buffer 10 with relation to the overhead pulse of FIG. 6B and with relation to the writing of the input data frames into the various cells of buffer 10. Thus, at the time that data is being written into cell 1 or cell 2, waveform C, by the timing of the arrows, shows that data is being read from cell 3 for two symbols and then from cell 1 for two symbols and then from cell 2 and then this repeats. At no time is data being read from a cell that is being written to. The design of the system is such that it can take care of situations where the position of the transmit overhead pulse can vary with respect to the input data frame. Although this position is stable once initiated, the waveform of FIG. 6D shows the maximum deviation from the commencement of writing to cell 1 by the input data frame whereas the waveform of FIG. 6B shows the minimum position (which position is coincident with the beginning of writing into cell 1). The waveform of FIG. 6E shows the reading times relative the writing of the input data into the cells of FIG. 6A for the maximum delay of the transmit overhead pulse of FIG. 6D. From the above FIGS. 4 through 6, it can be ascertained that during the time duration of a subframe, data is written into the buffer 10 of FIG. 1 four bits at a time in the following order of cells 1-2-3-1-2-3. During this same subframe, with the transmit overhead pulse in either the minimum or the maximum position shown in FIGS. 6B and D, data is read from the buffer 10 two bits at a time or one symbol at a time in the order of cells 3-3-1-1-2-2-3-3-1-1-2-2.

Waveforms A through E of FIG. 7 are essentially a repeat of FIG. 6 except that waveforms C and E show the timing or count within the transmit subframe counter 30 of FIGS. 1 and 2. Waveform C shows the minimum transmit overhead pulse position while the waveform of FIG. E in FIG. 7 shows the same timing or count for the maximum transmit overhead pulse. Waveform F shows the timing of the write operation for the receive signal when the overhead pulse of the receive signal falls at substantially the same time as the transmit overhead pulse. The numbered arrows labeled 1-2-3-1-2-3 indicate the clock edges for writing into the receive buffer 18 with the numbers indicating the cell number being written into at that moment in time. Thus, if the receive radio frame on line 54 of FIG. 1 is received with the framing pulse as shown in waveform F of FIG. 7, data will be written into frame 1 while it is being read, so as to be output on line 20, from cell 2. It is being written into cell 2 from the incoming receive radio frame while it is being read from cell 3, etc. Waveform G shows the maximum delay for the frame still occurring generally coincident with the transmit radio frame. Waveforms H and I show the range of the next possible set of positions of receipt of the frame pulse with waveform H being the minimum for that set of positions and I being the maximum. Again, it shows the cells into which the data is being written relative the reading of those cells as shown in waveform A of FIG. 7 (which time wise is identical with waveform Q of FIG. 8) by the receive buffer to interface with data frame line 20 of FIG. 1. Waveforms H and I also show that at the time of the transmit overhead pulse, whether it be minimum or maximum, will have a count within counter 74 which will be 11 or 0, respectively, when the RCV overhead pulse is anywhere in the range from H to I. Waveforms J and K again show a pair in the next time slot. It may be noted that if the transmit overhead pulse is in its minimum position when a receive signal is received having the minimum position frame pulse of J, then the cells written into will be the first number following each In other words, the first set of data will be written into cell 2, then cell 3, then 1-2-3-1. However, if the transmit overhead pulse is in its maximum position, then the cells written into in waveform J will be 1-2-3-1-2-3. The reason for this is that the counter 74 of FIG. 2 will have a count 10 at the time of the minimum position transmit overhead pulse of waveform B but will have a count of 11 at the time of the maximum transmit overhead pulse of waveform D, and it is this transmit overhead pulse which actuates the circuitry of FIG. 2 to being the writing sequence.

Waveforms L through O of FIG. 7 represent, as illustrated, receive overhead pulse positions 4 and 5 in their minimum and maximum position conditions.

FIG. 8 continues the presentation started in FIG. 7 for the various positions of the received pulse from 6 through 13 for each of the minimum and maximum positions. Waveform Q illustrates the output data frame appearing on waveform 20 and it will be noted that it is identical to the input data frame waveform of FIG. 7A. Over the beginning of each of the cells in waveform Q to illustrate timing, there is shown the clock edges of the read from receive data buffer 18 into the output data frame since the data is placed at the very beginning of the frame in a manner shown in FIG. 4C where, for the purposes of discussion, the data is retrieved from and supplied to the first four bits of a given synchronous data frame. These four bits however comprise the entire amount of information in the non-synchronous radio frame signals shown on leads 26 and 54 of FIG. 1. While these are shown as being radio frame signals, they can of course be any other non-synchronous data transmission means.

OPERATION

Usually, the generation of a radio frame signal from an input data frame (such as DS1) for retransmission and the steps of recovering a received radio frame signal and the regeneration of an output data frame are done separately. In other words, there is no correlation requirement between the two steps. In such a situation, the alignment of the received radio frame with the transmit radio frame is not an issue or a problem. However, if the input and output data frames are required to be aligned (synchronized), then the size of the output data buffer typically would increase in size to cover some maximum variation in alignment since the relationship of the received radio subframe to the output data frame is not fixed.

The present invention thus concerns itself with how to write received data into a data buffer in a manner such that there is no interference with reading from that data buffer to the output data frame where the reading is fixed in accordance with the writing to the other data buffer since the input/output data frame pair are in synchronous relationship whereas the transmit and received radio frame signals are not synchronous. The present invention illustrates how the output data buffer size can be kept small (i.e., the same size as the input data buffer) by detecting the skew or timing difference between the transmit and receive subframes. Once the skew between the transmit and receive subframes is determined, the relationship of the received radio subframe to the output data frame can be deduced and with this information an appropriate cell size data buffer and a read-write timing relationship can be generated whereby for each potential time delay a non-interfering read/write relationship can be logically generated to keep the size of the input and output data buffers the same.

In looking at FIGS. 1 and 4, it will be apparent that FIG. 4B illustrates the input data frame appearing on Lead 12 whereas 4C illustrates the timing of the output data frame on lead 20 from receive buffer 18. This data is occurring at a 1.554 megabit per second rate and comprises 192 data bits per frame plus a framming bit.

The present invention only removes a few data bits at the beginning of the frame and although the first eight data bits are removed in an actual embodiment of the invention, that is because two different channels of information are being utilized. For the purposes of the explanation only the first four bits of each input data frame are removed and inserted into the transmit buffer 10. Bits 1 and 2 are combined to form a phase sensitive symbol and are stored in a first location in cell 1 of transmit buffer 10 while bits 3 and 4 are combined to produce a second symbol and they are also stored in cell 1 of the transmit buffer. The next received input data frame again contributes an additional four bits and these are read into cell 2 of the transmit buffer 10. As will be noted by observing FIG. 6, while the data is being written into cell 1, a transmit overhead pulse for outputting on lead 26 is being generated and then information is read from previously written cell 3 for two bit time positions. While the input data frame is writing into cell 2, data is being read from cell 1 to be output on lead 26. The above statements of course refer to the situation where the transmit overhead pulse is in the minimum position. The events shown in waveforms D and E of FIG. 6 are what is occurring if the transmit overhead pulse is in the maximum time deviation position. Since, as will be noticed from FIG. 1 and FIG. 8 waveform Q, the same signal that writes input data into buffer 10 is used to read data out of buffer 18, the data that is in buffer 18 in cell 1 is read out at the same time the data from lead 12 is written into cell 1 of buffer 10. On the other hand, the received radio frame data on lead 54 has the receive overhead pulse varying in position from a maximum to minimum of each position for 13 possible positions as shown in the figures from waveform F of FIG. 7 to waveform P of FIG. 8. Thus, the data received immediately after the overhead pulse cannot automatically be written into a given cell. Rather, it has to be written into a cell as a function of the timing of the overhead pulse with respect to the data being read out to output data frame lead 20. Thus, the present technique was devised of measuring the time difference between the transmit overhead pulse and the receive overhead pulse. This happens to be accomplished by merely using the two counters of FIG. 2. The counter shown as 30 is used not only in the detection process but also in the read process as shown by output lead 28 from counter 30 as illustrated in FIG. 1. Thus, the counter 60 within FIG. 2 is providing an accurately representative indication of the bit position within the transmit radio frame. When the receiving equipment first synchronizes with the incoming receive radio frame appearing on lead 54, it produces a receive radio subframe sync detect pulse which is supplied on lead 90 to the NOR gate 80 of FIG. 2. This commences the counter 74 in a zero state and no further signals are received on lead 90 until, due to establishing another connection or for some reason, there is loss of synchronization with the receiving circuitry and the incoming radio frame data. Thus, the counter continually counts to 11 and once the 11 count is detected by block 78, the counter 74 is reset to count again. The time that it takes to reset the counter 74 comprises one of the zero counts and then the zero count itself comprises the other zero count position so that the 13 symbol positions of the ratio frame as shown in waveform C or E of FIG. 7, are accounted for by 2 "zero" count positions and the additional 11 count positions. The time of the transmit overhead pulse as illustrated in either waveform B or D of FIG. 6, produces an output on lead 70 to latch a signal onto the output set of leads 50 where there is a logic "1" on only one of the three leads for cell 1, cell 2, or cell 3 write enable. This establishes the start of the writing sequence as to whether data is first written into cell 1, 2, or 3 and then continues in the same order. In other words, if it is first instructed to write into cell 2, it continues through the rest of the subframe as cell 2, cell 3, cell 1, cell 2, cell 3, and cell 1. This is depicted in the various waveforms from FIG. 7 waveform F to FIG. 8 waveform P. As previously mentioned, the cell first written into is ascertained by logic circuitry within block 36 which produces an output on lead 84 if the count coincides with the logic formula shown immediately below as the conditions for initiating a "one". A logic "1" appears on lead 86 if the requirements fulfilling TWO in the equation below are fulfilled. The detection of these counts are summarized in the table of FIG. 3.

While the present invention is shown relative a first implementation of the inventive concept where DS1 and radio frame signals are utilized, the inventive concept may be utilized any time that there is an interface required between a synchronous pair of data supplying frame type signals and a pair of non-synchronized frame type signals. Further, although the present invention is disclosed as a situation where only four of the data bits of the higher frequency signal are used in the non-synchronous signal, the basic concept can be used with any two sets of signals regardless of the frequencies. Although it is believed that three (3) is the minimum number of cells that can be used in buffer 10 to provide non-interfering read and write situations, there would be instances where the timing is such that more than 3 cells may be required for optimal performance.

In view of the above, I wish to be limited not by the exact embodiment shown, but only by the concept of detecting the time difference between the framing bits transmitted and received of a non-synchronous pair of data signals to establish the writing of the received signal into a receive data buffer in a varying manner so as to prevent interference with the reading of data from that data buffer as part of the interface with a synchronized pair of data signals.

I therefore wish to be limited only by the scope of the appended claims wherein I claim:

1. The method of adjusting the writing of a received signal, having a periodically occurring framing bit, into a data buffer by detecting the time delay between the occurrence of the framing bit with respect to a similarly constructed, but non-synchronous, transmitted signal for interfacing with a pair of synchronized data input and output signals while not using stuffing bits comprising the steps of:

counting positions within a receive signal frame relative a given starting reference;

comparing the count of said receive signal position at the time of a comparable given starting reference in the transmit frame;

generating a write cell reference to a receive buffer as a function of the comparison; and writing to said receive buffer in a fixed periodic sequence based upon the generated write cell reference value subsequent to each comparison and generation.

2. The method of mux/demux interfacing between synchronized, frame defined input/output data transmission means and non-synchronized frame defined transmit/receive data transmission means comprising, the steps of:

writing data from each frame of input data to a segment in a series of segments of a transmit buffer in a given sequence;

counting incoming data bits and incrementing the segment to which data is written in said transmit buffer while simultaneously incrementing an identical segment in a receive buffer for reading data to be output on said data transmission means;

reading data out of each segment of said transmit buffer in said given sequence starting with the segment written to immediately prior to a transmit framing pulse and continuing in the given sequence order until the next framing pulse for providing a transmit radio frame signal;

receiving a receive radio frame signal;

detecting the time difference between frame bit positions of said transmit frame signal and said receive radio frame signal;

selecting an initial write segment, of said receive buffer, as a function of the detected time difference between frame bit positions;

writing incoming receive radio frame signals into said receive buffer starting with the selected initial write segment and continuing in the given sequence order until the next transmit framing pulse; and reading data out of said receive buffer to said data transmission means from the segments therein in the same order as they are written to the transmit buffer as referenced above.

3. Apparatus for adjusting the writing of a received signal having a periodically occurring framing bit, into a receive buffer of a data transmission node, relative a similarly constructed and transmitted, but non-synchronized, signal being read from an xmt buffer in said node while not using stuffing bits whereby there is no interference with writing and reading of a pair of synchronized data lines to and from said xmt and receive buffer respectively comprising, in combination:

receive signal first means for counting positions within a received signal frame relative a framing bit reference;

signal transmitter second means, connected to said first means, for comparing the count of said received signal position at the time of occurrence of a framing bit in the transmit signal;

xmt buffer third means, including a plurality of cells and connected to said second means, for receiving data written into one cell from an input/output synchronized data node while outputting data read from a different cell to a non-synchronized input/output data node;

receive buffer fourth means, including a plurality of cells, for receiving data written into one cell from a non-synchronized input/output data node while outputting data read from a different cell to an input/output synchronized data node;

fifth means, connected to said second means, for generating a write cell reference to said receive buffer fourth means as a function of the comparison; and sixth means, connected to said fourth and fifth means, for writing to said receive buffer fourth means in a fixed periodic sequence based upon the generated write cell reference value subsequent to each comparison and generation.

4. Node apparatus for mux/demux interfacing between synchronized frame defined input/output data transmission means and non-synchronized frame defined transmit/receive data transmission means comprising, in combination:

multiple cell buffer first means, including synchronized input data means, non-synchronized output data means, write cell address means and read cell address means, for temporarily storing incoming data in accordance with addresses supplied to said write cell address means while simultaneously outputting data from another cell in said first means in accordance with an address supplied to said read cell address means;

multiple cell buffer second means, including non-synchronized input data means, synchronized output data means, write cell address means and read cell address means, for temporarily storing incoming data in accordance with addresses supplied to said write cell address means while simultaneously outputting data from another cell in said first means in accordance with an address supplied to said read cell address means;

addressing third means, connected to said write cell address means of said first means and to said read cell address means of said second means, for initiating write and read functions to and from identically addresses ones of said cells of said first and second buffer means respectively, and said synchronized data transmission means;

addressing fourth means, connected to said first means, for reading data out of each cell of said buffer first means in a given sequence identical to the sequence of said third means and starting with the cell written to immediately prior to the transmission of a generated non-synchronized output data framing pulse and continuing in the given sequence order until the next framing pulse for providing a non-synchronized output data signal;

receiver fifth means for receiving a non-synchronized input data signal including periodically occurring framing bits;

logic sixth means, connected to said fourth and fifth means, for detecting the time difference between frame bit positions of said non-synchronized output and input data signals; and addressing seventh means, connected to said second, fifth and sixth means, for selecting an initial write cell, of said buffer second means, as a function of the detected time difference between frame bit positions and writing signals from said fifth means into said buffer second means starting with the selected initial write cell and continuing in the given sequence order used by said fourth means until the next framing pulse is detected, the selection of the initial cell being such that there can be simultaneous writing and reading of data in said second means but in different cells.

* * * * *